United States Patent
Grisamore

(10) Patent No.: US 6,535,901 B1
(45) Date of Patent: Mar. 18, 2003

(54) METHOD AND APPARATUS FOR GENERATING A FAST MULTIPLY ACCUMULATOR

(75) Inventor: Robert T Grisamore, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 09/558,902

(22) Filed: Apr. 26, 2000

(51) Int. Cl.$^7$ ................................................ G06F 7/50
(52) U.S. Cl. ....................................................... 708/629
(58) Field of Search ................................ 708/629, 626, 708/603, 523, 501, 709

(56) References Cited

U.S. PATENT DOCUMENTS

| | | | | |
|---|---|---|---|---|
| 5,751,619 A | * | 5/1998 | Agarwal et al. | 708/523 |
| 6,434,587 B1 | * | 8/2002 | Liao et al. | 708/629 |
| 6,460,064 B1 | * | 10/2002 | Lee | 708/518 |
| 2002/0116433 A1 | * | 8/2002 | Awaka et al. | 708/603 |

OTHER PUBLICATIONS

Computer Arithmetic, 2000, pp. 125–140, 172–189, 203–204.
A Suggestion for a Fast Multiplier, C.S. Wallace, IEEE Transactions Electronic Computers, vol. EC–13, 1964, pp. 14–17.

* cited by examiner

Primary Examiner—David H. Malzahn
(74) Attorney, Agent, or Firm—Timothy W. Markison

(57) ABSTRACT

A method and apparatus for generating a fast multiply accumulation circuit includes processing that begins by determining number of current partial products for a multiplication of a first multiplicand and a second multiplicand. The processing then continues by determining size of the current partial products. The processing then continues by identifying one of a plurality of reduction patterns based on the size of the current partial products. The processing then continues by determining number of, and configuration of, full adders and half adders required for a reduction function of the current partial products based on the one of the plurality of reduction patterns and the size of the current partial products, wherein the multiply-accumulator performs the reduction function.

16 Claims, 5 Drawing Sheets

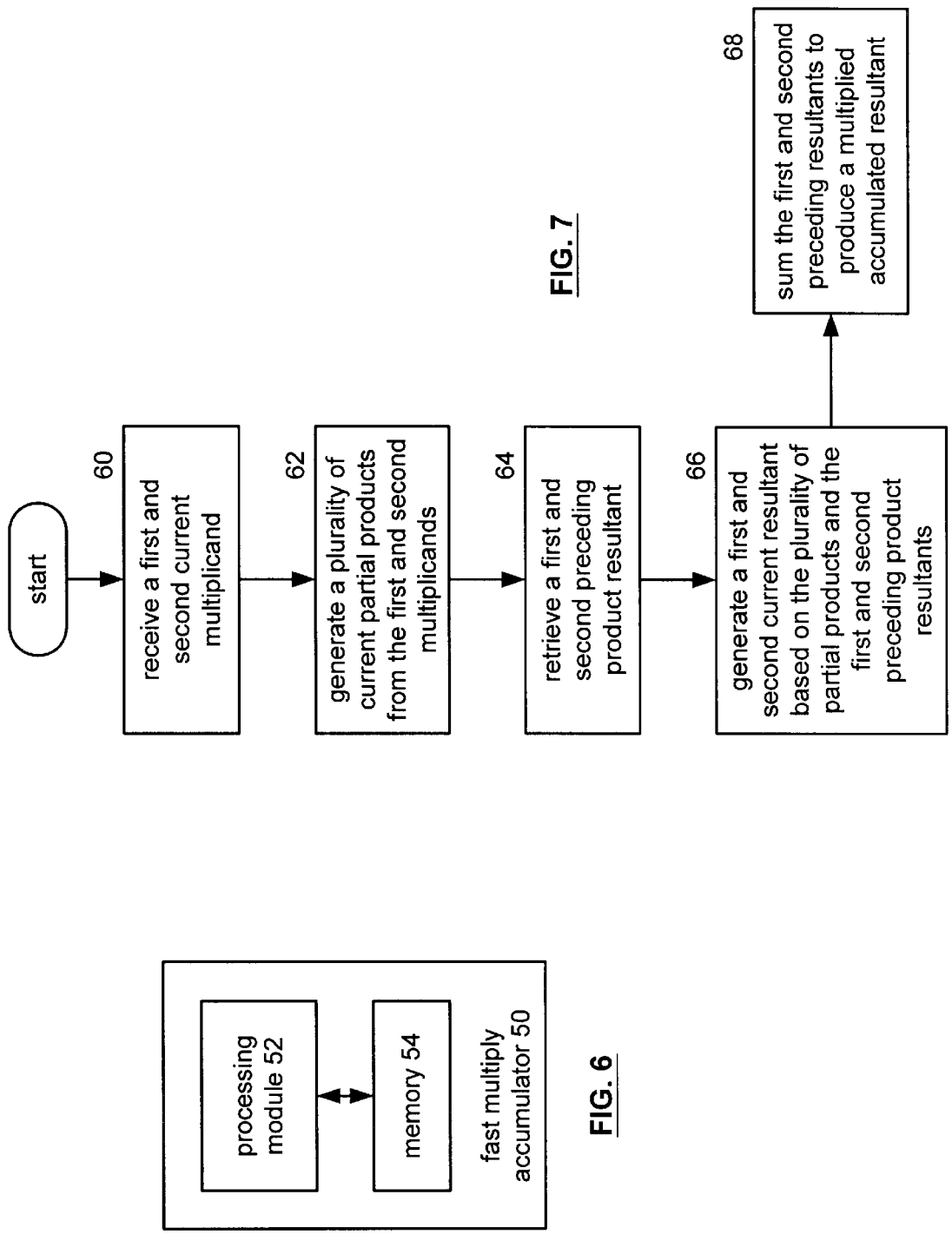

ical Field of the Invention

METHOD AND APPARATUS FOR GENERATING A FAST MULTIPLY ACCUMULATOR

TECHNICAL FIELD OF THE INVENTION

This invention relates generally to digital signal processing and more particularly to a fast multiple accumulation for use in digital signal processing.

BACKGROUND OF THE INVENTION

As is known, high-speed digital signal processing architectures require high speed, high throughput, multiply accumulation hardware. This is especially true for broad band communication systems where high-speed digital filters with wide dynamic range must be efficiently implemented. Typically, current multiple accumulation hardware represents a trade-off between computation latency, chip area complexity and throughput. Such multiply accumulation designs have four main elements: partial product generator, partial product reduction, carry propagation addition, and an accumulator (e.g., an adder). The partial product generator is operably coupled to receive a first and second multiplicand and produce a plurality of partial products. The partial product reduction circuit receives the plurality of partial products and reduces them into first and second reduced partial products. A carry propagation adder receives the first and second reduced partial products and produces therefrom a first resultant. The first resultant is accumulated with a previous resultant via the accumulator to produce an accumulated result. The accumulated result is stored in a register and is accumulated with a subsequent result from the carry propagation adder.

To improve the performance capabilities of a multiply accumulator, an array multiplier may used to produce the partial product and sum the partial product simultaneously. Such an architecture provides the advantages of efficiency in integrated circuit lay out and ease of pipelining by using registers at optimal points in the array multiplier. As is known, pipelining provides a high through put multiple accumulate circuit but at the expense of area and pipeline start-up delays.

The partial product reduction circuit may be implemented as a Dadda or Wallace reduction area tree module, which receives the plurality of partial products and the current multiply accumulate resultant. From these inputs, the partial tree reduction circuit produces two output operands, which are summed by an adder and stored in an output register. As such, by feeding back the accumulated output into the reduction tree circuit, the multiple accumulate function occurs within the reduction circuit. This allows for a single cycle multiple accumulate to occur. While this implementation allows for a multiply accumulate resultant to be produced in a single clock cycle, the overall speed of the multiply accumulator is limited by the speed of the partial product generation circuit and the carry propagate adder. As such, the larger the multiple accumulate function, the slower the operating cycle needs to be for the multiple accumulate circuit.

Therefore, a need exists for a method and apparatus for a fast multiply accumulation circuit that is not limited by the speed of the partial product reduction circuit as in existing multiply accumulators.

BRIEF DESCRIPTION OF THE DRAWINGS

FIG. 6 illustrates a schematic block diagram of an alternate fast multiply accumulator in accordance with the present invention;

FIG. 7 illustrates a logic diagram of a method for fast multiple accumulation in accordance with the present invention;

DETAILED DESCRIPTION OF A PREFERRED EMBODIMENT

Generally, the present invention provides a method and apparatus for a fast multiply accumulation circuit and/or process. The method and apparatus includes processing that begins by determining number of current partial products for a multiplication of a first multiplicand and a second multiplicand. The processing then continues by determining size of the current partial products. The processing then continues by identifying one of a plurality of reduction patterns based on the size of the current partial products. The processing then continues by determining number of, and configuration of, full adders and half adders required for a reduction function of the current partial products based on the one of the plurality of reduction patterns and the size of the current partial products, wherein the multiply-accumulator performs the reduction function. With such a method and apparatus, a fast multiply accumulation circuit may be generated that is not limited by the speed of the partial product reduction circuit as in existing multiply accumulators. As such, the present multiple accumulation method and apparatus provides for a higher speed multiply accumulate circuit than existing multiply accumulators.

Figure 1:
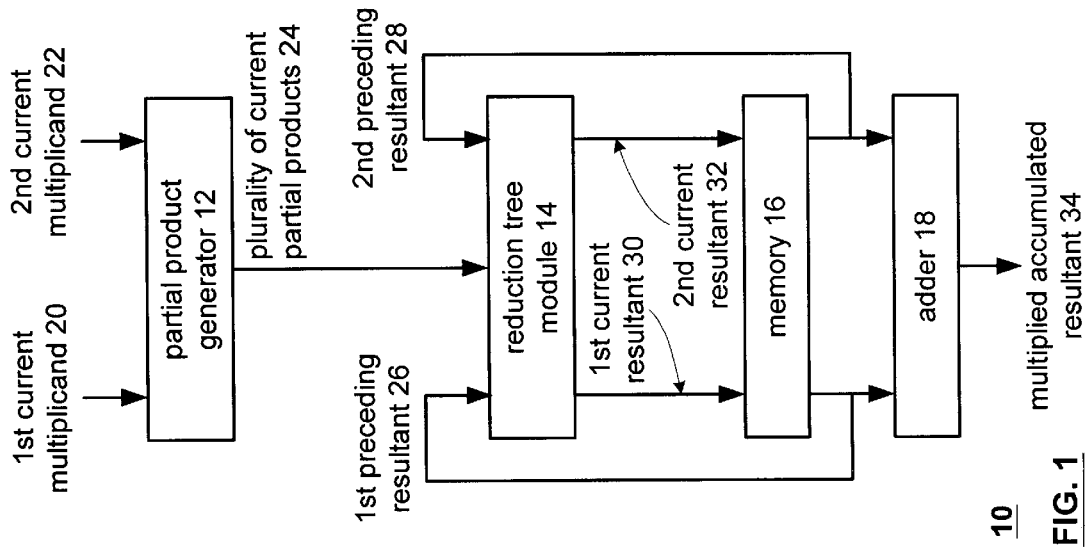
FIG. 1 illustrates a schematic block diagram of a fast multiply accumulator in accordance with the present invention.

The present invention can be more fully described with reference to FIGS. 1 through 9. FIG. 1 illustrates a schematic block diagram of a fast multiple accumulator 10 that includes a partial product generator 12, a reduction tree module 14, memory 16 and an adder 18. The partial product generator 12 is operably coupled to receive a first current multiplicand 20 and a second current multiplicand 22. Based on these inputs, the partial product generator produces a plurality of current partial products 24. The number of partial products generated will be dependent on the number of bits in the second current multiplicand 22. For example, if the second current multiplicand includes four bits, the plurality of current partial products 24 will include four partial products. The generation of the partial products will be discussed in greater detail with reference to FIG. 4.

The reduction tree module 14 is operably coupled to receive the plurality of current partial products 24, a first preceding resultant 26 and a second preceding resultant 28. The reduction tree module 14, which may be a Dadda tree reduction module or a Wallace tree reduction module, produces a first current resultant 30 and a second current resultant 32. The first and second current resultants are stored in memory 16 and will be used in the next cycle as the first and second preceding resultants 26 and 28. At the same time the first and second preceding resultants 26 and 28 are received by the reduction tree module 14, they are summed by adder 18 to produce a multiplied accumulated resultant 34. By feeding back the first and second preceding resultants, as opposed to the multiple accumulated resultant 34 as in prior art implementations, the overall processing speed of the fast multiply accumulator 10 is significantly increased. In addition, the die area required to implement the fast multiply accumulate section on an integrated circuit is smaller than the prior art multiply accumulators. For example, in a prior art multiply accumulate circuit that has two pipeline stages, a tree reduction matrix with a height of 24, and two carry look-ahead adders, the number of gates required is 2,275, an area of design of 0.262 millimeters squared, an operating speed of 100 megahertz yielding a speed to area ratio of 382 megahertz/millimeters squared. As a comparative example, if the multiple accumulator of the present invention is implemented to include two pipeline stages, a reduction tree matrix with a height of 26, and one carry look-ahead adder requires 2,195 gates, consumes a design area of 0.248 millimeters, and operates at 166 megahertz producing a speed to area ratio of 669 megahertz/millimeters squared.

The adder 18, which may be a carry look-ahead adder, receives the first and second preceding resultants 26 and 28 and produces a multiplied accumulated resultant 34. The first and second preceding resultants 26 and 28 are generated from a plurality of partial products that resulted from preceding first and second multiplicands. Accordingly, a plurality of partial products can be generated every cycle from new first and second multiplicands. The current partial products 24 the first preceding resultant 26 and second preceding resultant 28 are processed by the reduction tree module 14 to produce the first and second current resultants 30 and 32. As configured, the reduction tree module 14 performs the multiply accumulate function by combining the first and second preceding resultants 26 and 28 with the current partial products 24.

Figure 2:
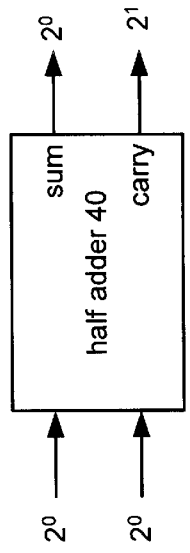
FIG. 2 illustrates a schematic block diagram of a half adder circuit in accordance with the present invention.
Figure 3:
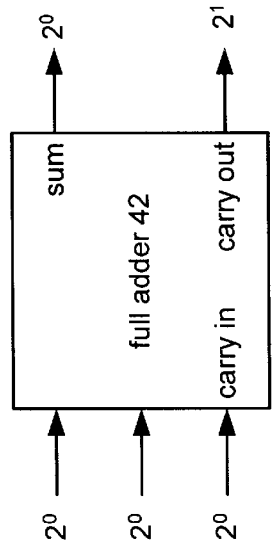
FIG. 3 illustrates a schematic block diagram of a full adder in accordance with the present invention.

The reduction tree module 14 includes a plurality of half adders and full adders to produce the first and second current resultants 30 and 32. The number of full adders and half adders needed to implement the reduction tree module 14 is dependent upon the height and width of the plurality of partial products 24. Determining the number of full adders and half adders to comprise the reduction tree module 14 will be discussed with reference to FIGS. 8 and 9. A half adder 40 is shown in FIG. 2 and full adder 42 is shown in FIG. 3. The half adder 40 of FIG. 2 includes a first single bit input and second single bit input and produces, therefrom, a single bit sum resultant and a single bit carry resultant. The full adder 42 includes three single bit inputs: two of the inputs receive bits from the operands and the third input receives a single bit carry in. From these inputs, the full adder 42 produces a single bit sum output and a single bit carry output. The function of a half adder and a full adder are known thus no further discussion will be presented except to further illustrate the present invention. As one of average skill in the art will appreciate, multi-bit half adders and full adders may be used within the reduction tree module 14.

Figure 4:
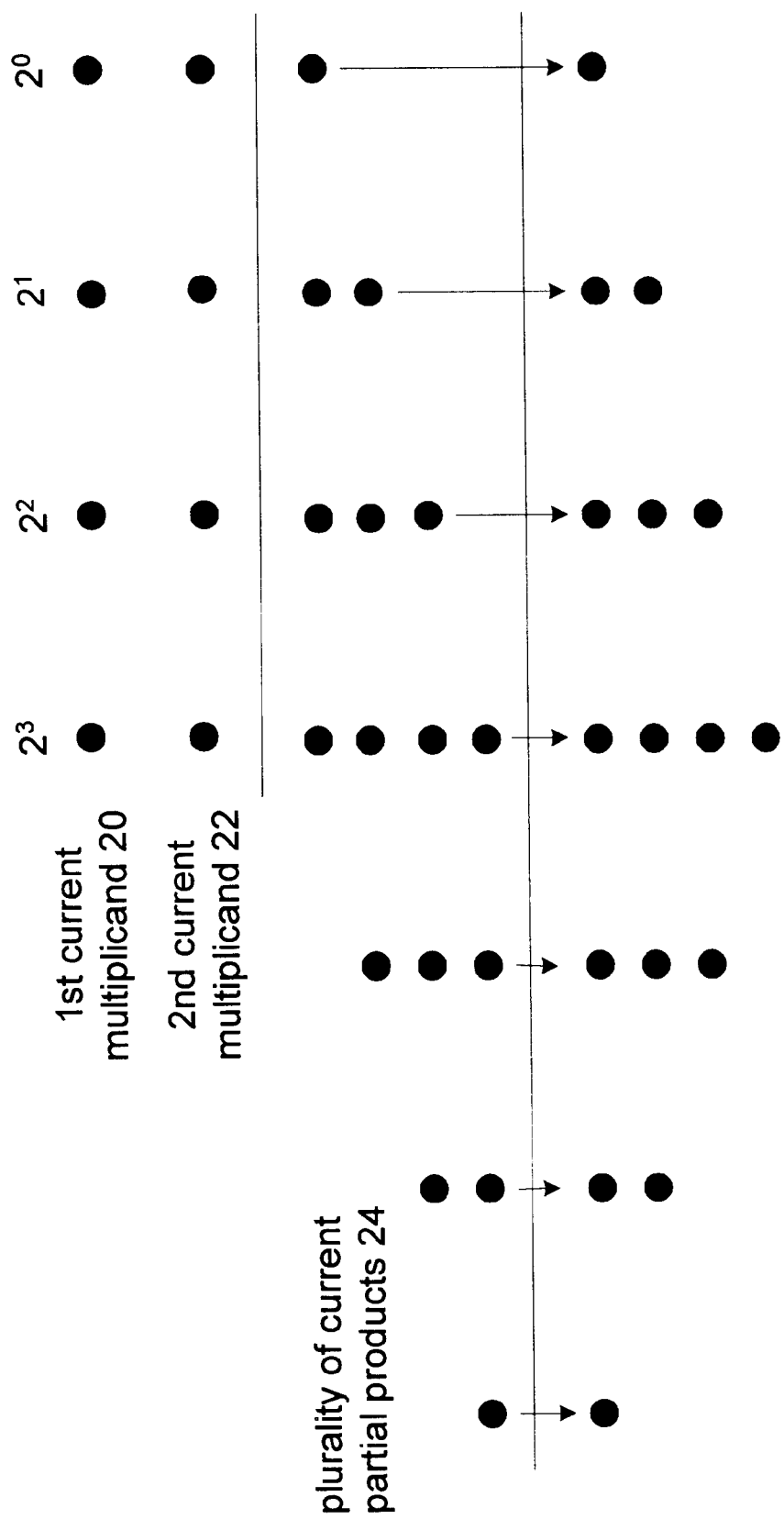
FIG. 4 illustrates a graphical representation of multiplying two multiplicands in accordance with the present invention.

FIG. 4 illustrates an example of producing the plurality of partial products 24 from a first and second multiplicand 20 and 22. The illustration includes dots for bits within the first and second multiplicands 20 and 22 and the corresponding plurality of current partial products 24. In general, the production of the plurality of partial products 24 is done in accordance with long hand multiplication. To begin, the least significant bit of the second current multiplicand 22, which corresponds to the $2^0$ position is multiplied with each of the bits in the first current multiplicand 20. The resultant of this operation is shown in the first line of the plurality of partial products 24. To produce the second line of the current partial products, the second least significant bit of the second multiplicand (e.g., $2^1$ position) is multiplied with each bit of the first multiplicand 20. To preserve the ordering, the partial product produced by multiplying the second least significant bit of the second multiplicand with the bits of the first multiplicand is shifted to the left by one bit position. The third and fourth lines of the plurality of partial products 24 are produced by multiplying the third least significant bit of the second multiplicand 22 (e.g., $2^2$ position) with the bits of the first multiplicand and the fourth line is produced by multiplying the fourth least significant of the second multiplicand (e.g., $2^3$ position) with the bits of the first multiplicand.

The plurality of current partial products 24 may be re-drawn to produce an inverted pyramid as shown below the second line in FIG. 4. From the inverted pyramid, the size of the partial products can be readily determined from its height and width. The height of the partial products 24 is dependent on the number of bits in the second multiplicand 22. In the example of FIG. 4, the second multiplicand included four bits, thus the height of the partial products 24 is four. As one of average skill in the art would appreciate, the number of the bits in the second multiplicand as well as in the first multiplicand may be more or less than the four bits illustrated in FIG. 4. Further note that the number of bits in the first and second multiplicands does not have to match. For example, the first multiplicand may have more bits than the second multiplicand, or vice-versa. However, to reduce the height of the plurality of partial products, it is often desirable to have the second multiplicand 22 to have an equal number or less number of bits than the first multiplicand 20. The width of the partial products 24 is based on the number of bits in the first multiplicand and the second multiplicand. As shown, the width is the sum of the number of bits in the first and second multiplicands less one.

Figure 5:
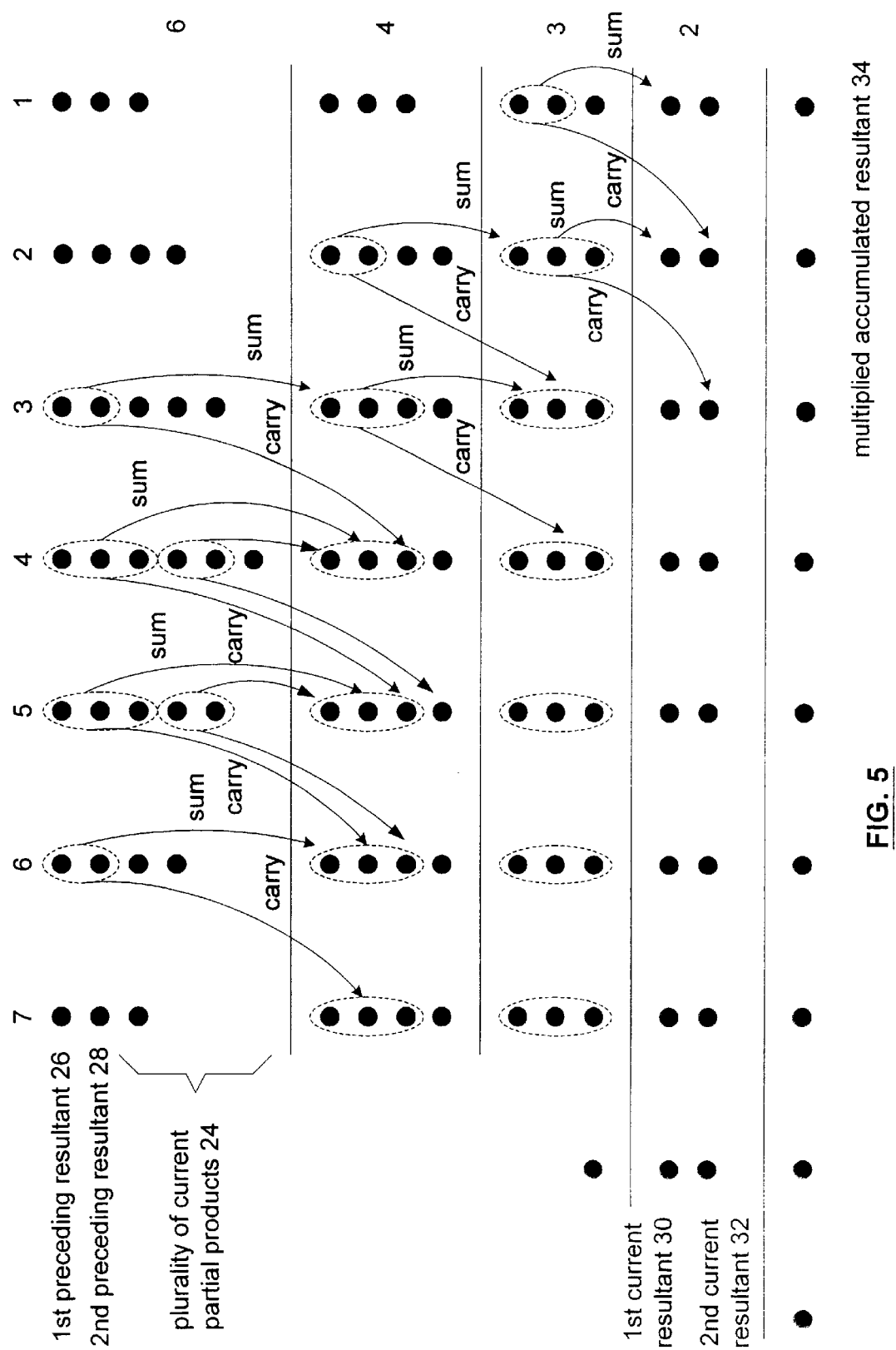
FIG. 5 illustrates a graphical representation of producing a multiplied accumulate resultant in accordance with the present invention.

FIG. 5 illustrates the operation of the reduction tree module 14 for producing the first and second current resultants 30 and 32 from the current partial products 24 of FIG. 4, the first preceding resultant 26 and the second preceding resultant 28. As shown, the first preceding resultant 26, the second preceding resultant 28 and the plurality of current partial products 24 are aligned in a dot pattern. In this dot pattern, the height of the reduction tree matrix is six. To reduce the partial products 24, the first preceding resultant 26 and the second preceding resultant 28 into the first and second current resultants 30 and 32, a reduction pattern is used. The reduction pattern used will depend on the initial height of the reduction tree matrix, which equals the height of the partial products plus the first and second preceding resultants 26 and 28. A reduction sequence for a 24 by 24 multiply-accumulator using this method may follow the pattern of reducing the height from 26 to 19 to 13 to 9 to 6 to 4 to 3 to 2. As one of average skill in the art would appreciate, the height may be greater than or less than 26 and follow a similar pattern.

For the example of FIG. 5, the reduction pattern is to reduce the height from six to four to three to two. To reduce the height from six to four, a plurality of half-adders and full-adders are required within the reduction tree module.

Starting from the right most column of bits, the height of this column of bits is three. Since this column's height is less than the current reduction height, the bits are copied from height layer #6 to height layer #4. The second column from the right has a bit height of four. Since this column's height is equal to the current reduction height, these bits are copied from height layer #6 to height layer #4. The third column from the right has a bit height of five. Since this column's height (i.e., 5) is greater than the current reduction height (i.e., 4), this column of bits needs to be reduced. To reduce this column, a half-adder sums two of the bits to produce a sum and a carry. The sum is provided to the third column from the right in height layer #4 while the carry is provided the fourth column from the right in height layer #4. The remaining three bits of the third column of height layer #6 are copies to the third column of height layer #4.

The fourth column of bits in height layer #6 includes six bits, which needs to be reduce to three bits due to the carry from the third column. To reduce the six bits to three bits, a full adder and a half adder are used. The full adder sums three of the bits to produce a sum that is provided to the fourth column of height layer #4 and to produce a carry that is provided to the fifth column of height layer #4. The half adder sum two bits of the fourth column of height layer #6 to produce a sum that is provided to the fourth column of height layer #4 and to produce a carry that is provided to the fifth column of height layer #4. The remaining bit of the fourth column of height layer #6 is copied to the fourth column of height layer #4.

The fifth column of height layer #6 includes five bits, which needs to be reduce to two bits due the carries from the fourth column. To reduce the five bits to two bits, a full adder and a half adder are used. The full adder sums three of the bits to produce a sum that is provided to the fifth column of height layer #4 and to produce a carry that is provided to the sixth column of height layer #4. The half adder sum two bits of the fifth column of height layer #6 to produce a sum that is provided to the fifth column of height layer #4 and to produce a carry that is provided to the sixth column of height layer #4.

The sixth column of height layer #6 includes four bits, which needs to be reduce to two bits due the carries from the fifth column. To reduce the four bits to two bits, a full adder is used. The full adder sums three of the bits to produce a sum that is provided to the sixth column of height layer #4 and to produce a carry that is provided to the seventh column of height layer #4. The remaining bit of the sixth column of height layer #6 is copied to the sixth column of height layer #4. The seventh column includes three bits, which do not need to be reduced. Thus, the three bits of column seven of height layer #6 are copied to column seven of height layer #4.

To reduce the number of bits in each column of height layer #4 to three bits, a similar process is followed. As shown, the number of bits in column one of height layer #4 includes three bits that are copied to column one of height layer #3. Column two of height layer #4 includes four bits, which needs to be reduced to three bits. To accomplish this reduction, a half-adder is used. The remaining columns of height layer #4 include 4 bits, which needs to be reduced to two bits due to the carry from the preceding column. To accomplish this reduction, a full-adder is used.

To reduce the number of bits in height layer #3 to two bits, a half adder and a plurality of full-adders are used. As shown, the first column includes three bits and using a half-adder to sum two of the three bits. The resulting sum is provided to the first column of height layer #2 and the carry is provided to the second column of height layer #2. The remaining bit of the first column of height layer #3 is copied to the first column of height layer #2. The second column of height layer #3 includes three bits, which need to be reduced to one bit due to the carry from column 1. To accomplish this reduction, a full adder is used. The resulting sum is provided to the second column of height layer #2 and the carry is provided to column 3 of height layer #2. The remaining columns of height layer #3 utilize full adders to produce sum and carry values that are provided to height layer #2 as shown.

Once the reduction tree module 14 has reduced the plurality of current partial products and the first and second preceding resultants to a height layer of two, the first and second current resultants are obtained. The first and second resultants 30 and 32 are summed together to produced the multiplied accumulated resultant 34. As one of average skill in the art would appreciate, the number of bits in the first and second preceding resultants and the height and width of the plurality of current partial products will vary depending on the number of bits in the first and second current multiplicands. For example, for a 24-bit input and two accumulated previous resultants, which produces a 48-bit resultant, the height of the partial product matrix tree would be 26, which would require seven stages of reduction. The seven stages of reduction include a reduction from 26 to 19 to 13 to 9 to 6 to 4 to 3 to 2.

FIG. 6 illustrates a schematic block diagram of an alternate fast multiply accumulator 50. The fast multiply accumulator 50 includes a processing module 52 and memory 54. The processing module 52 may be a single processing device or a plurality of processing devices. Such a processing device may be a digital signal processor, microprocessor, microcomputer, logic circuitry, state machine and/or any device that manipulates digital signals based on operational instructions. The memory 54 may be a single memory device or a plurality of memory devices. The memory device may be a random access memory, read-only memory, flash memory, hard drive memory, virtual memory, and/or any memory device that stores digital information. Note that if the processing module implements one or more of its functions via a state machine or logic circuitry, the memory storing the corresponding operational instructions is embedded within the circuitry comprising the state machine or logic circuitry. The operational instructions stored in memory 54 and executed by processing module 52 may the processing steps as shown in FIG. 7.

FIG. 7 illustrates a logic diagram of method for fast multiply and accumulate. The process begins at step 60 where first and second current multiplicands are received. The process then proceeds to step 62 where a plurality of current partial products is generated from the first and second current multiplicands. The process then proceeds to step 64 where first and second preceding product resultants are retrieved. The first and second preceding product resultants are the corresponding resultants from a reduction tree process produced from preceding first and second multiplicands.

The process then proceeds to step 66 where a first and second current resultants are generated based on the plurality of current partial products and the first and second preceding product resultants. As the current partial products are produced, they may be stored in corresponding registers. Note that the generation of the first and second current resultants may be done by utilizing a Dadda tree reduction function, or a Wallace tree reduction function, upon the plurality of current partial products, the first preceding product resultant, and the second preceding product resultant to produce the first and second current resultants.

The process then proceeds to step 68 where the first and second preceding resultants are summed together to produce a multiplied accumulated resultant. Note that the first and second preceding resultants were stored in corresponding registers on a preceding cycle and are overwritten in the current cycle by the first and second current resultants.

Figures 8, 9:
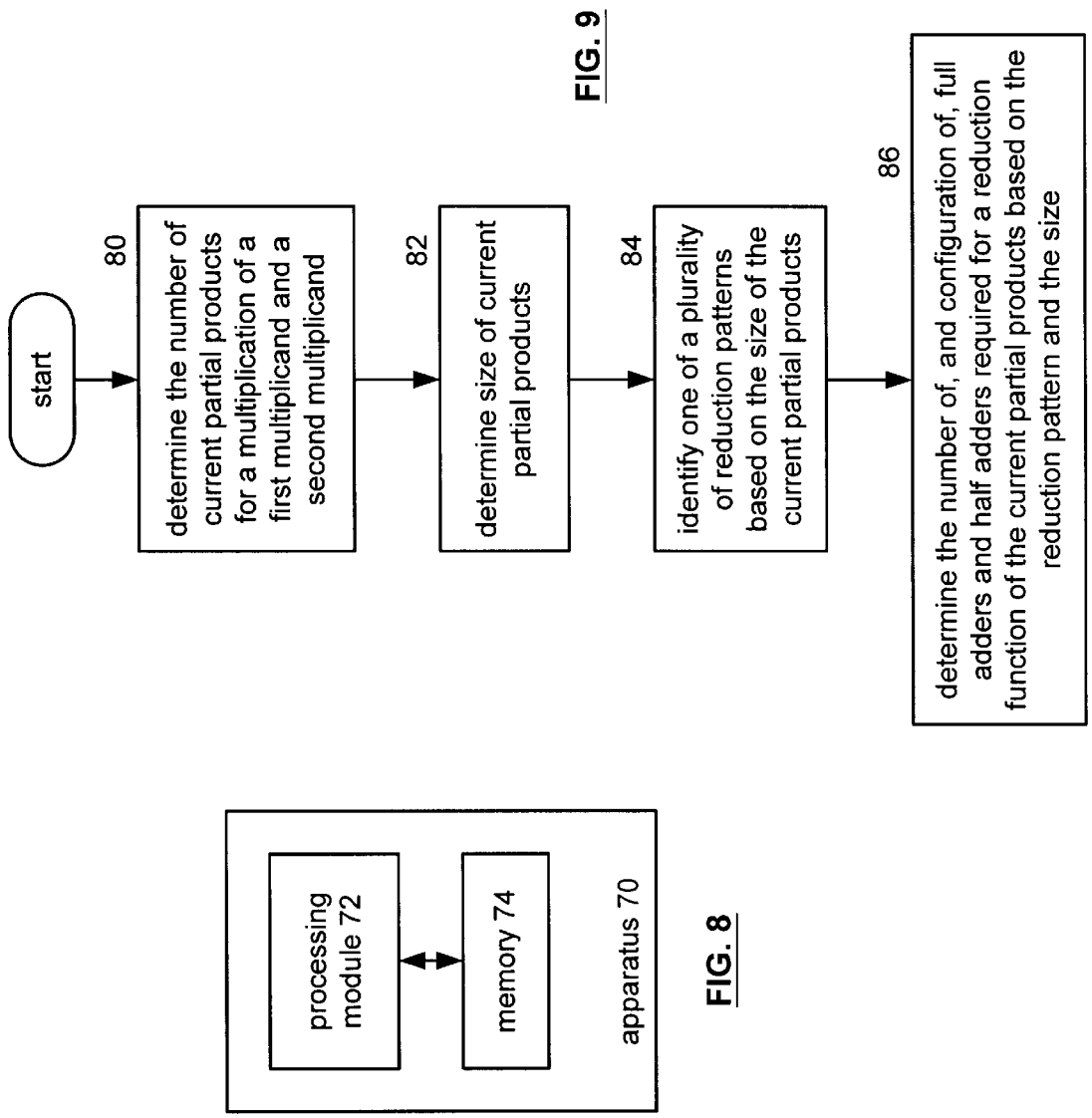
FIG. 8 illustrates a schematic block diagram of an apparatus for developing a fast multiple accumulator in accordance with the present invention.
FIG. 9 illustrates a logic diagram of a method for developing a fast multiply accumulator in accordance with the present invention.

FIG. 8 illustrates a schematic block diagram of an apparatus 70 for developing a fast multiply accumulator. The apparatus 70 includes a processing module 72 and memory 74. The processing module 72 may be a single processing device or a plurality of processing devices. Such a processing device may be a digital signal processor, microprocessor, microcomputer, logic circuitry, state machine and/or any device that manipulates digital signals based on operational instructions. The memory 74 may be a single memory device or a plurality of memory devices. The memory device may be a random access memory, read-only memory, flash memory, hard drive memory, virtual memory, and/or any memory device that stores digital information. Note that if the processing module implements one or more of its functions via a state machine or logic circuitry, the memory storing the corresponding operational instructions is embedded within the circuitry comprising the state machine or logic circuitry. The operational instructions stored in memory 74 and executed by processing module 74 may the processing steps as shown in FIG. 9.

FIG. 9 illustrates a logic diagram of a method for developing a fast multiply accumulator. The process begins at step 80 where the number of current partial products for a multiplication of first and second multiplicands are determined. 2. The number of current partial products may be determined by determining number of bits in the second multiplicand and equating the number of current partial products to the number of bits in the second multiplicand. As such, if the second multiplicand includes four bits, the number of current partial products will be four. To limit the number of current partial products, the second multiplicand may be selected to be associated with an operand having an equal number or less bit than another operand and the first multiplicand is selected to be associated with the another operand.

The process then proceeds to step 82 where the size of the current partial products is determined. The size of the current partial products may be determined by determining a width of the current partial products based on bit size of the first and second multiplicands and determining a height of the current partial products based on the bit size of the second multiplicand, wherein the bit size of the second multiplicand is equal to or less than the bit size of the first multiplicand.

The process then proceeds to step 84 where one of a plurality of reduction patterns is identified based on the size of the current partial products. The particular reduction pattern identified may be determined based on the height of the current partial products. For example, as shown in FIG. 5, the height of the partial products is four. Because the reduction tree process includes the first and second preceding resultants, the height of the reduction matrix is 6. As such, the reduction pattern is based on a height of 6.

The process then proceeds to step 86 where the number of, and configuration of, full and half adders is determined for a reduction function based on the reduction pattern and the size of the current partial products. The determination of the number, and configuration of, the full adders and half adders may be done by determining, for each row of the current partial products, a number of full adders and half adders based on the reduction pattern and the width of the current partial products. For example, as shown in FIG. 5, when the height was reduced from 6 to 4, a specific pattern of full adders and half adders is obtained. From this specific pattern, the number of, and configuration of, full and half adders is readily determined. As one of average skill in the art will appreciate, each row of reduction will have a specific pattern of full adders and half adders based on the width of the row. In general, the specific pattern includes no adders when the number of bits in a column of the preceding height layer is less than the number of bits in the current height layer. When the number of bits in a column of the preceding height layer is equal to the number of bits in the current height layer, no adders are needed when the preceding column did not include an adder. If the preceding column included an adder, then the current column requires a half adder. If the number of bits in a column of the preceding height layer is to be reduced by two bits, then a full adder is needed. If the number of bits in a column of the preceding height layer is to be reduced by three bits, then a full adder and a half adder are needed. If the number of bits in a column needs to be reduced by four bits, then two full adders are needed. Accordingly, a full adder reduces the bit count by two and a half adder reduces the bit count by one. Thus, a combination of full and half adders will provide the needed bit count reduction. As one of average skill in the art will appreciate, the number of bits that a column needs to be reduced by is determined in accordance with the reduction pattern and the number of carries from the preceding column. For example, when reducing the height of the reduction tree matrix from 13 to 9 and there are three carries from the preceding column, the 13 bits needs to be reduced to 6. Thus a reduction of seven is needed, which requires three full adders and one half adder.

The preceding discussion has presented a method and apparatus for fast multiply and accumulate. Such a fast multiply and accumulator operates at rates greater than existing multiply accumulators and does so with less gates. As one of average skill in the art will appreciate, other embodiments may be derived from the teachings contained herein without deviating from the scope of the claims.

What is claimed is:

1. A method for developing a fast multiply-accumulator, the method comprises the steps of:

determining number of current partial products for a multiplication of a first multiplicand and a second multiplicand;

determining size of the current partial products;

identifying one of a plurality of reduction patterns based on the size of the current partial products; and determining number of, and configuration of, full adders and half adders required for a reduction function of the current partial products based on the one of the plurality of reduction patterns and the size of the current partial products, wherein the multiply-accumulator performs the reduction function.

2. The method of claim 1, wherein the determining the number of current partial products further comprises:

determining number of bits in the second multiplicand; and equating the number of current partial products to the number of bits in the second multiplicand.

3. The method of claim 2 further comprises:
selecting the second multiplicand to be associated with an operand having an equal number or less bit than another operand; and selecting the first multiplicand to be associated with the another operand.

4. The method of claim 1, wherein the determining the size of the current partial products further comprises:
determining a width of the current partial products based on bit size of the first and second multiplicands; and
determining a height of the current partial products based on the bit size of the second multiplicand, wherein the bit size of the second multiplicand is equal to or less than the bit size of the first multiplicand.

5. The method of claim 4, wherein the identifying the one of the plurality of reduction patterns further comprises determining the one of the plurality of reduction patterns based on the height of the current partial products.

6. The method of claim 5, wherein the determining the number, and configuration of, the full adders and half adders further comprises:
determining, for each row of the current partial products, a number of full adders and half adders based on the one of the plurality of reduction patterns and the width of the current partial products.

7. The method of claim 1, wherein the plurality of reduction patterns includes reduction patterns corresponding to Dadda tree reduction process.

8. The method of claim 1, wherein the plurality of reduction patterns includes reduction patterns corresponding to Wallace tree reduction process.

9. An apparatus for developing a fast multiply-accumulator, the apparatus comprises:
a processing module; and
memory operably coupled to the processing module, wherein the memory stores operational instructions that cause the processing module to: determine number of current partial products for a multiplication of a first multiplicand and a second multiplicand; determine size of the current partial products; identify one of a plurality of reduction patterns based on the size of the current partial products; and determine number of, and configuration of, full adders and half adders required for a reduction function of the current partial products based on the one of the plurality of reduction patterns and the size of the current partial products, wherein the multiply-accumulator performs the reduction function.

10. The apparatus of claim 9, wherein the memory further comprises operational instructions that cause the processing module to determine the number of current partial products by:
determining number of bits in the second multiplicand; and
equating the number of current partial products to the number of bits in the second multiplicand.

11. The apparatus of claim 10, wherein the memory further comprises operational instructions that cause the processing module to:
select the second multiplicand to be associated with an operand having an equal number or less bit than another operand; and
select the first multiplicand to be associated with the another operand.

12. The apparatus of claim 11, wherein the memory further comprises operational instructions that cause the processing module to determine the size of the current partial products by:
determining a width of the current partial products based on bit size of the first and second multiplicands; and
determining a height of the current partial products based on the bit size of the second multiplicand, wherein the bit size of the second multiplicand is equal to or less than the bit size of the first multiplicand.

13. The apparatus of claim 12, wherein the memory further comprises operational instructions that cause the processing module to identify the one of the plurality of reduction patterns by determining the one of the plurality of reduction patterns based on the height of the current partial products.

14. The apparatus of claim 13, wherein the memory further comprises operational instructions that cause the processing module to determine the number, and configuration of, the full adders and half adders by:
determining, for each row of the current partial products, a number of full adders and half adders based on the one of the plurality of reduction patterns and the width of the current partial products.

15. The apparatus of claim 9, wherein the plurality of reduction patterns includes reduction patterns corresponding to Dadda tree reduction process.

16. The apparatus of claim 9, wherein the plurality of reduction patterns includes reduction patterns corresponding to Wallace tree reduction process.

* * * * *